(12) United States Patent
Packbier et al.

(10) Patent No.: US 8,739,113 B2
(45) Date of Patent: May 27, 2014

(54) TRACKING DEVICE AND METHOD FOR VERY LARGE-SCALE SOFTWARE DEVELOPMENT PROJECTS

(75) Inventors: Raymond Packbier, Bocholtz (NL); Peter Kemp, Voerendaal (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 478 days.

(21) Appl. No.: 12/950,550

(22) Filed: Nov. 19, 2010

(65) Prior Publication Data

US 2011/0191746 A1  Aug. 4, 2011

Related U.S. Application Data

(60) Provisional application No. 61/300,255, filed on Feb. 1, 2010.

(51) Int. Cl.
*G06F 9/44* (2006.01)
(52) U.S. Cl.
USPC .......................................... 717/103
(58) Field of Classification Search
USPC .............. 707/999.01, 999.104; 717/100–101, 717/120, 125, 103; 705/7.13, 323; 715/234, 715/751; 340/3.1
See application file for complete search history.

(56) References Cited

U.S. PATENT DOCUMENTS

| | | | | |
|---|---|---|---|---|
| 6,957,186 B1* | 10/2005 | Guheen et al. | ................ | 705/323 |
| 6,983,227 B1* | 1/2006 | Thalhammer-Reyero | ........ | 703/2 |
| 7,386,797 B1* | 6/2008 | Chatterjee et al. | ............. | 715/751 |
| 2003/0106039 A1* | 6/2003 | Rosnow et al. | ............... | 717/100 |
| 2004/0117768 A1* | 6/2004 | Chang et al. | .................... | 717/125 |
| 2005/0240623 A1* | 10/2005 | Kobza et al. | ................ | 707/104.1 |
| 2005/0289503 A1* | 12/2005 | Clifford | ........................ | 717/101 |
| 2007/0150805 A1* | 6/2007 | Misovski | ....................... | 715/518 |
| 2007/0203912 A1* | 8/2007 | Thuve et al. | .................... | 707/10 |
| 2010/0077380 A1* | 3/2010 | Baker et al. | .................... | 717/120 |
| 2010/0257457 A1* | 10/2010 | De Goes | ........................ | 715/751 |

* cited by examiner

*Primary Examiner* — Tuan A Vu (57) ABSTRACT

The present invention discloses a method, in a network, of synchronizing a plurality of software development teams, with each team working on an assigned subset of a code development project. A repository comprising all code base of the code development project is provided and each team's assigned subset is correlated with every other team's assigned subset within the code development project. The repository automatically merges all team member inputs so that each subset is linked in a visual representation of each team's assigned subset to stories within connected subsets so that the real-time status of a connected subset may be graphically displayed. A real-time status of each assigned subset, including all correlations between each subset in the project can be determined and any team member, upon demand, can activate and display the visual representation of the real-time status of each subset, the relations between subsets, and the real-time status of the whole development project.

14 Claims, 7 Drawing Sheets

TRACKING DEVICE AND METHOD FOR VERY LARGE-SCALE SOFTWARE DEVELOPMENT PROJECTS

CROSS-REFERENCE TO RELATED APPLICATIONS

This application claims the benefit of U.S. Provisional Application No. 61/300,255, filed Feb. 1, 2010, the disclosure of which is incorporated herein by reference.

BACKGROUND OF THE INVENTION

The present invention relates to software development. More particularly, and not by way of limitation, the present invention is directed to a system and method for "Agile" software development based on principles of iterative development, where self-organized cross-functional teams elaborate requirements and solutions through collaboration.

Adopting 'Agile' software development methods and systems to the needs of very large-scale (greater than 100 designers) software projects has many challenges. Agile software development refers to a group of software development methodologies based on iterative development, where requirements and solutions evolve through collaboration between self-organizing cross-functional teams. Some components of agile software development become extremely hard to realize when implementing in large scale parallel development on a common code base. Components such as: collaboration; self-organizing teams; and clear priorities (work on most important business items first) can have problems such as technical dependencies in the software or testing that often translate to dependencies between teams, which limit the possibilities of the teams to independently plan the work over time and business priorities get blurred due to timing constraints that teams set between each other.

Currently available Agile business supporting solutions/applications address the tracking and planning needs of agile teams. However, with many teams working in parallel, these applications have very limited possibilities of allowing the teams to identify and manage their dependencies to other teams. This is a serious impediment that can hinder many large software development projects and organizations to successfully implement Agile software design.

It would be advantageous to have a system and method for improving or eliminating the above described impediments to overcome the disadvantages of the prior art. The present invention provides such a system and method.

BRIEF SUMMARY OF THE INVENTION

The present invention discloses a method, in a network, of synchronizing a plurality of software development teams, with each team working on an assigned subset of a code development project. A repository comprising all code base of the code development project is provided and each team's assigned subset is correlated with every other team's assigned subset within the code development project. A member of a team operating in a particular subset of the code development project may input the current status of that team member's progress using a terminal connected to the network to access the repository. The repository automatically merges all team member inputs to provide a visual and interactive representation of connections between all the subsets in the project and the real-time status of each story within each subset. Each subset is linked in the visual representation of each team's assigned subset to stories within connected subsets so that the real-time status of a connected subset is graphically displayed the status of the connected subset is updated. A real-time status of each assigned subset, including all correlations between each subset in the project can be determined. Any team member, upon demand, can activate and display; the visual representation of the real-time status of each subset, the relations between subsets, and the real-time status of the whole development project.

A further embodiment of the present invention includes incorporating an agile business support application, wherein all relevant information entered by the team members and the teams is made available to the agile business support application, including existing scoping and timing.

Another embodiment of the present invention includes making particular functional views of the visual presentation available to each team member role, the particular functional views including a technical dependency view and a resource view.

A still further embodiment of the present invention includes an anatomy handling device tracking impact of each update entered by every team member and dynamically updating the cumulative status of all the subsets as the subsets relate to every connecting subset in the development project.

Still another embodiment of the present invention includes the plurality of development teams being between 80 and 1000 teams.

Another embodiment of the present invention comprises the anatomy handling device automatically notifying each team regarding the team's current status and any directly connected team's status.

An embodiment of the present invention is disclosed as an anatomy handling device for synchronizing a plurality of software development teams, with each team working on an assigned subset of a code development project. The anatomy handling device comprises a repository that includes all code base of the code development project. A correlating interface is provided for correlating each team's assigned subset with every other team's assigned subset within the code development project. A member of a team involved in a particular subset of the code development project may use a terminal connected to the network for accessing the repository to input a current status of the team member's progress within the particular subset. The repository comprises merging means for automatically merging all team member inputs, in order to provide a visual representation of connections between all the subsets in the project and the real-time status of each story within each subset. Linking means is included for linking the visual representation of each team's assigned subset to stories within connected subsets so that the real-time status of a connected subset may be graphically displayed upon demand. Determining means for determining a real-time status of each assigned subset including all correlations between each subset in the project is provided. Receiving means for receiving a signal sent by any team member, for displaying the visual representation of the real-time status of each subset, the relations between subsets, and the real-time status of the whole development project.

Another embodiment of the present invention includes means for incorporating an agile business support application, wherein all relevant information entered by the team members and the teams is made available to the agile business support application, including existing scoping and timing.

Still another embodiment of the present invention includes means for restricting particular functional views of the visual presentation available to each team member role, the particular functional views including a technical dependency view and a resource view.

A further embodiment of the present invention includes the anatomy handling device having means for tracking impact of each update entered by every team member and dynamically updating the cumulative status of all the subsets as the subsets relate to every connecting subset in the development project.

A still further embodiment of the present invention is direded to means for automatically signaling each team regarding the team's current status and any directly related team's status.

. . .

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

The following definitions of terms will be used throughout the balance of this document.

Abbreviations

Anatomy handling device a processor in a server utilizing a particular set of instructions for managing and effecting various operations with respect to internal and external technical dependencies and restrictions of a code development project LSV Latest System Version; item on a trunk branch in a distributed revision control system Repository Common structured data store used by one or more applications concurrently Role A role dedicated to a user which determines the access rights to a particular subset of the functional items in the repository (e.g. stories). Also dedicated views can be displayed based on a specific role.

RRC IBM Rational Requirement Composer© Requirement handling application

RS Requirement Specification Document containing a requirement catalog for a certain (commercial) feature of a product RTC IBM Rational Team Concert© Collaborative development environment for software teams that includes integrated functionality for work items, source control, build, agile planning and reporting Scrum Iterative incremental framework for doing work according to agile methodologies Sprint Basic time unit of development in Scrum development methodology.

Story A story is a software system requirement formulated as one or more sentences in the everyday or business language of the user Team A cross-functional group of people responsible for managing itself to develop a software system described by stories Team Member A team member is one of the roles that a user can have.

Team Velocity Average amount of work effort a Scrum team can produce in a sprint.

User A person operating a client (see Team Member)

Work Package SW delivery from an agile feature team towards a trunk branch (merge from team branch to trunk branch in distributed revision control system).

The present invention provides an "anatomy" handling server, (may be referred to interchangeably throughout the remainder of the document as server, tool or device) in agile software development design methodology. An anatomy handling device added to existing agile development support products. The introduction of applications for management of concurrent versions and team dependencies in agile support solutions is referred to hereinafter as 'anatomy handling'. There are other agile business support products that may be used in conjunction with an anatomy tool. An example of an agile development support product that can be used in conjunction with an anatomy tool is the IBM Rational "Jazz" based family of products (e.g., Rational Team Concert). For illustration purposes only and for the sole intention of a better understanding of the invention, the following description of embodiments make reference to the IBM Jazz product family as well as using Jazz's terminology. There are other agile support products from other sources that can be used in conjunction with the anatomy tool.

Figure 1:
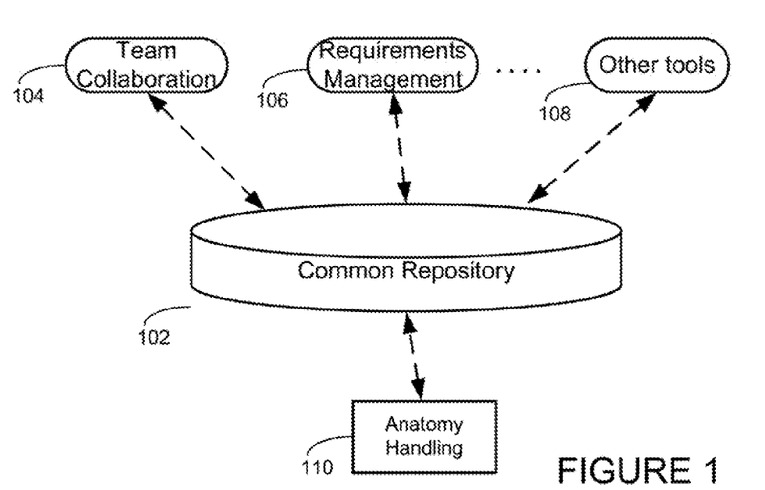
FIG. 1 depicts a system architecture in which the anatomy handling device is employed in accordance with an embodiment of the present invention

FIG. 1 depicts a high level view of system architecture in which an anatomy handling device/server is employed in accordance with an embodiment of the present invention. As shown, Repository 102 is managed and directed by Anatomy Handling tool 110. Repository 102 includes all the "stones", or system requirements, of all the teams and any content that has to do with a particular software development project. Team collaboration 104 is managed by team collaboration software modules (e.g., Rational Team Concert); requirements management 106 is provided by "requirement" management software (e.g., Rational Requirements Composer) and other tools 108 including portfolio planning. Collected information is then used to provide different views on the make-up, or anatomy of the software development project.

Figure 2A:
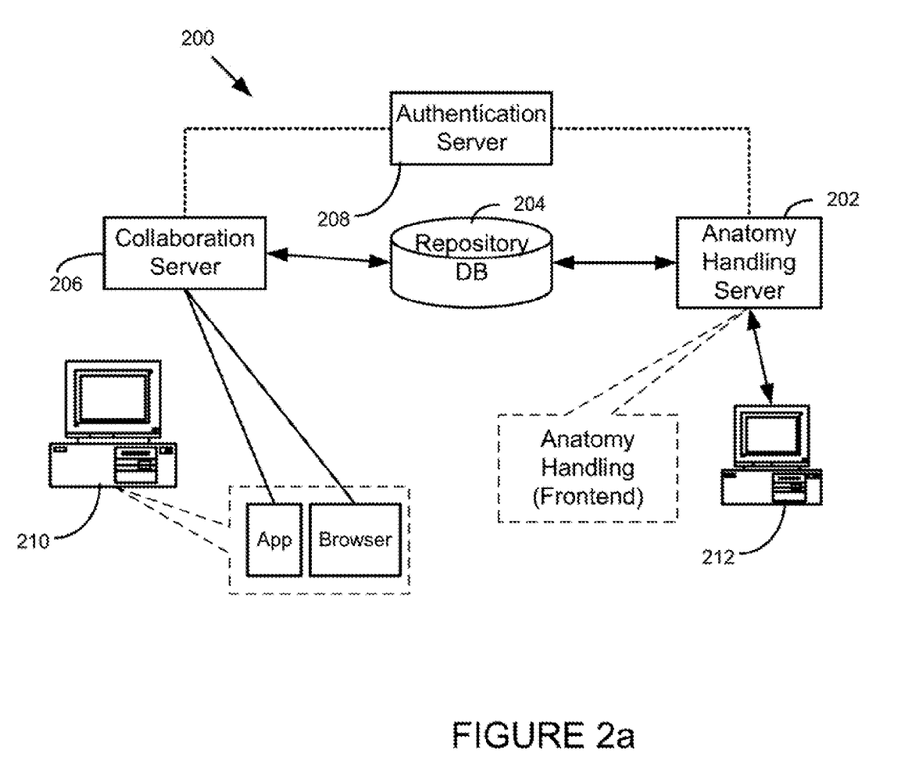
FIG. 2a illustrates an implementation of the present invention in accordance with an embodiment of the present invention.

FIG. 2a illustrates an implementation of the present invention in accordance with an embodiment of the present invention. The overall system comprises collaboration server 206, anatomy handling device/server 202 (front and backend), repository database 204 and assigned user client devices 210 and 212 (used by team members) who connect to collaboration and anatomy handling servers over the network, using either a standard internet browser or a dedicated desktop application (a client device is employed by a user to access tools and the repository). The collaboration server includes collaboration software that runs in an application server (e.g., IBM WebSphere or Apache Tomcat) on top of a standard server operating system, e.g., RedHat Linux or Microsoft Windows Server. Collaboration server 206 stores its data in Repository Database 204 which may be physically located on a different physical server (e.g., the database could be a "tablespace" inside an Oracle server).

As shown in FIG. 2*a*, Anatomy Handling may comprise both a front-end and a back-end. The back-end provides a mechanism to retrieve data from Repository Database 204 and to store the visualized data in form of an anatomy chart. The front-end is a client running on top of an operating system or an application running inside a web browser. Both Collaboration Server 206 and Anatomy Handling Server 202 use a common authentication mechanism. An alternative to a front-end/back-end implementation may be a client-based installation of the anatomy handling application having direct access to the repository database. Both alternatives may even coexist.

A collaborative development environment for software teams typically includes integrated functionality for work items, source control, build, agile planning and reporting, etc., such as the IBM Rational Team Concert© Collaborative development environment. Anatomy handling device in handling software development both visualizes and coordinates timing and technical dependencies between parallel and sequential development activities. The introduction of anatomy handling for agile software development enables agile teams to work on concurrent versions of the same software by providing a correlated overview and tracking system of dependent development activities.

Such an anatomy handling device provides the agile development teams with all information and means needed to coordinate their work and plans with other teams without the need of a superimposed coordination function.

Figure 2B:
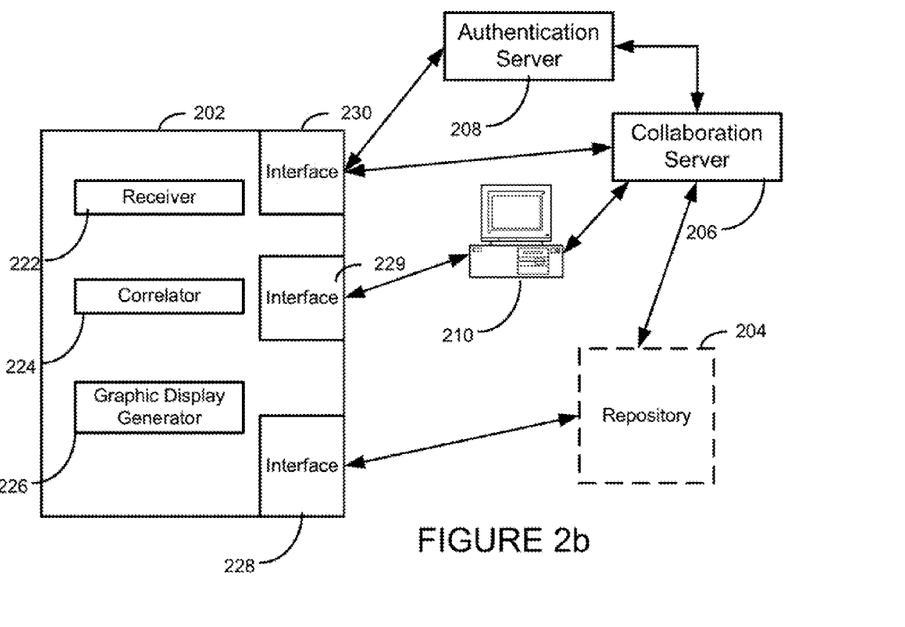
FIG. 2b is a high-level block diagram of an anatomy handling device according to an embodiment of the present invention.

FIG. 2*b* is a high-level block diagram of an anatomy handling server according to an embodiment of the present invention. Functional aspects of the anatomy handling device include:

Real-time visualization and sharing of all team development plans;

Real-time visualization and sharing of the status of team progress and planning stability;

Different user roles have individual visualizations basing on the detail level or on a certain functional view (technical dependency view, resource view etc.).

Full integration into agile business support applications makes use of existing scoping, timing and all other relevant information entered by the product owners and the agile teams in business support applications;

In managing the code base, anatomy handling server 202 tracks planned impacts on individual software entities and highlights and tracks needed code merging activities.

FIG. 2*b* is a high-level block diagram of an anatomy handling server according to an embodiment of the present invention. The Anatomy Handling server 202 comprises a receiver 222 connected to interface 230 through which communications with Authentication server 208 and Collaboration server 206 take place.

Client 210 may be used to update subset status of a team's progress or view the status of an associated (linked) subset available in Repository database 204. Client 210 accesses Collaboration server 206 to update Repository database 204 and the update request is routed to Authentication server 208.

After authentication, the request is routed to Anatomy Handling server 202 and the request is received into interface 230. The request is then routed to receiver 222, which sends the request to correlator 224 for correlating the requested update with any other subset that is linked, dependent upon or otherwise associated with client 210 subsets in Repository 204 via interface 228. All data including the subsets that area assigned to the teams are stored in Repository 204 and Anatomy Handling server 202 manages the input and output of Repository 204

If client 210 is requesting a display of the current status of any subsets that are linked to client 210 subset, the request is routed via interface 229 to graphic display generating function 226, which generates and provides the display to client 210's terminal via collaboration server 206.

To a large extent, the data and technical implementation is based on available applications. It is the new usage and combination of the data and methodologies that are used to give a new type of always up-to-date visualization of technical dependencies, delivery plans and planning quality tailored for the synchronization of multiple agile teams working on a common software code base. The anatomy handling device is fully integrated with the other business support applications (e.g. team collaboration application, requirement handling device) meaning that the applications have a common repository and a possibility of full data-interchange and synchronization. In other words: the anatomy handling device can access and modify artifacts in the repository handled by other applications and vice-versa.

Figure 3:
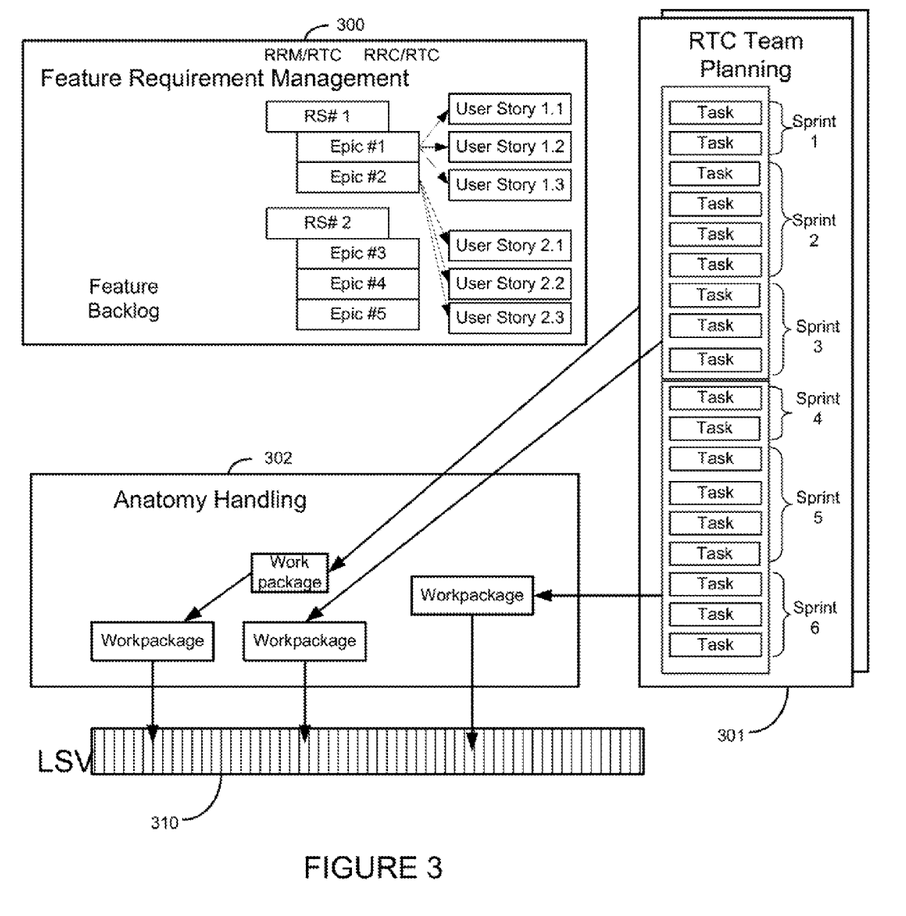
FIG. 3 depicts an activity overview that facilitates coordination in accordance with an embodiment of the present invention.

FIG. 3 depicts an activity overview that facilitates coordination in accordance with an embodiment of the present invention. The activity overview includes feature requirement management activity 300, agile team planning activity 301 and anatomy handling activity 302. Feature requirement management activity 300 and team planning activity 301 are instantiated on a per-feature base (self-organizing teams) and the anatomy handling activity 302 is a single instance.

Anatomy handling (server) facilitates coordination of timing and technical dependencies between individual feature teams working in concurrent team branches and coordination of deliveries coming from the concurrent team branches (Work Packages) towards common trunk (Latest System Version) branch 310.

Figure 4:
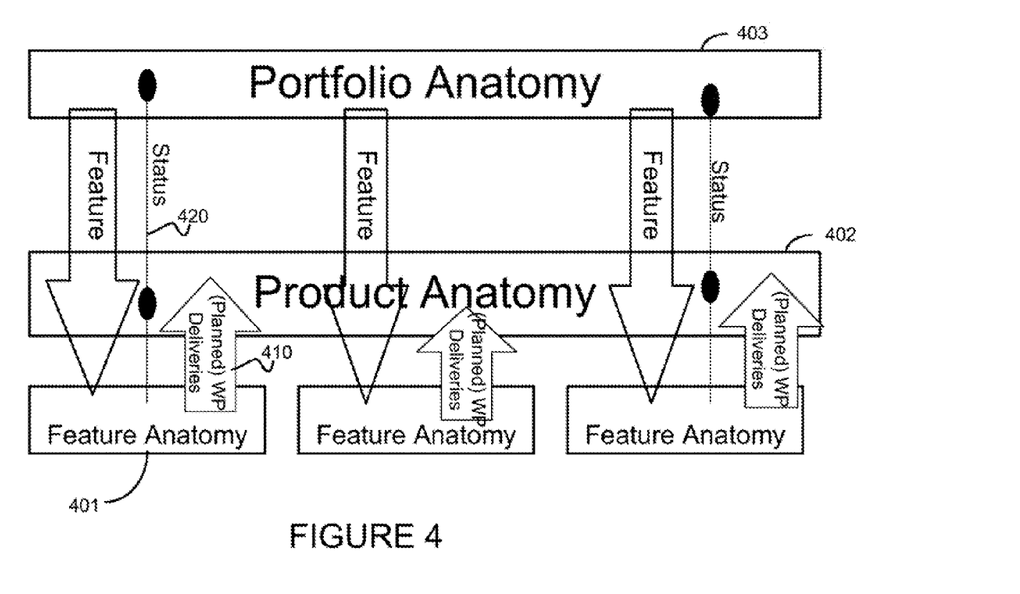
FIG. 4 illustrates the levels of visualization of the anatomy handling device in accordance with an embodiment of the present invention.

FIG. 4 illustrates the levels of visualization of the anatomy handling device in accordance with an embodiment of the present invention. As the figure illustrates there are different granularity levels of visualization (401, 402, 403) on delivery and dependency information within the repository. A user (e.g., team member) navigates through the various levels of the anatomy device as well as the related artifacts in other applications in the agile business support product; e.g., to find User Stories related to a certain work package in team collaboration application.

The anatomy visualization levels are hierarchically structured; there is one Portfolio Anatomy 403 level for the whole project. For every feature described in the Portfolio Anatomy 403, there will be one individual feature anatomy 401. If a delivery for a specific product is planned in feature anatomy 410, this delivery is shown in the respective product anatomy 402. Status information 420 is propagated from feature anatomy 401 to all related artifacts in product anatomies 402 and portfolio anatomy 403.

Figure 5:
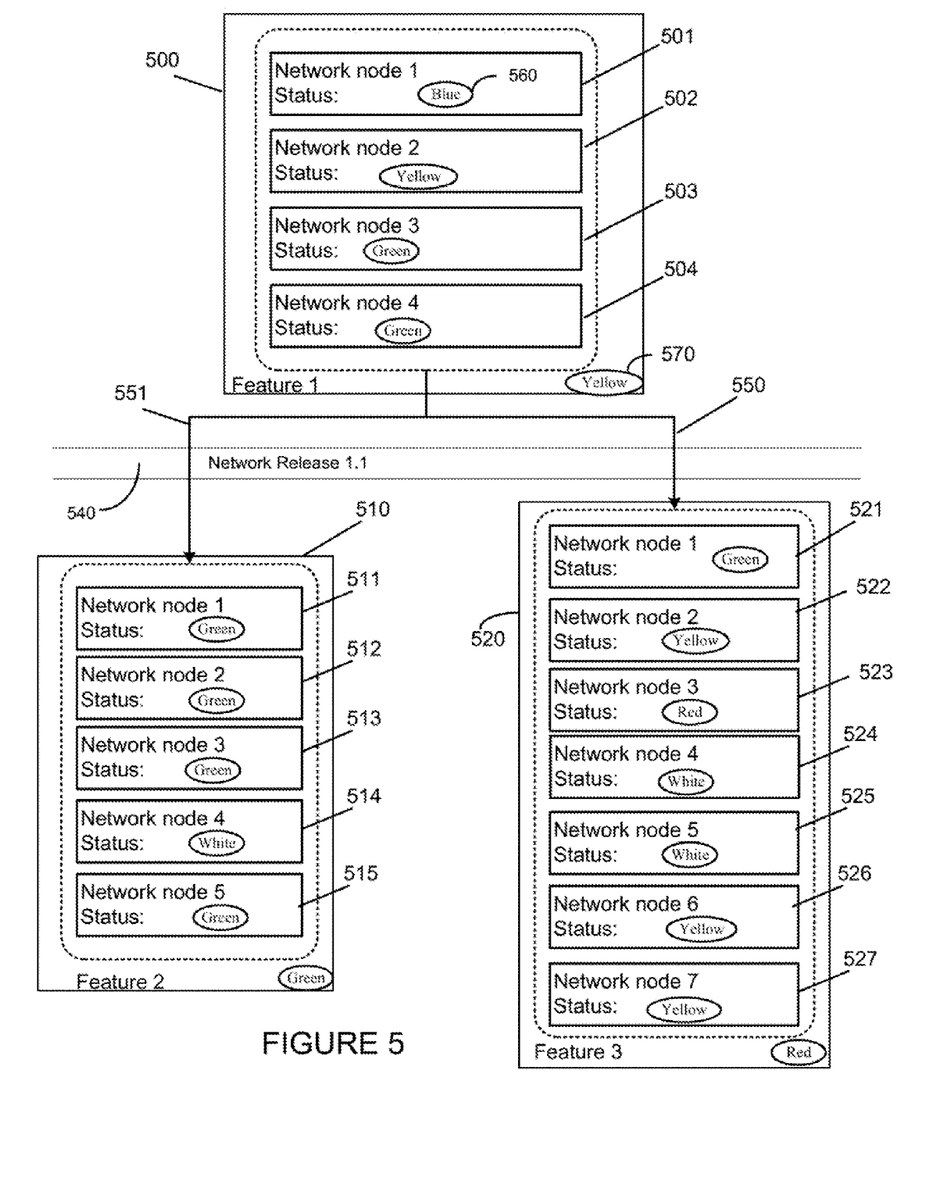
FIG. 5 depicts portfolio anatomy with three features and respective impacted products according to an embodiment of the present invention.

FIG. 5, depicts portfolio anatomy with three features 500, 510 and 520 and respective impacted products 501-504, 511-515, 521-527 according to an embodiment of the present invention. Information is displayed on product portfolio level displaying the features that are added to the product(s) for a certain release 540 of the system (project). If more products are impacted for a specific impacted product 501-504, 511-515, 521-527) (e.g., multiple network nodes in a telecommunication network) a link is provided to the feature and product anatomies in those products. Dependencies 550 and 551 are shown between (commercial) features (e.g., in order to implement a search function in a database, the database needs to be implemented first) and status information. 560 is aggregated on a per-feature 570 and per-product 560 level.

As mentioned above, there are different levels of visualization required. Reflecting on the "Portfolio Anatomy", the planning and maintaining may be supported via a Unified Modeling Language (UML) application. The access to the application has to be controlled by a role based model where only model owner with the specific role will get modify access. The roles having modification access are Portfolio Management and a Release Project responsible. The application adapts to the dedicated role where the available functionalities have to be limited to the needed actions. All users have read access only.

The application provides the ability to place the different artifacts as: Features (500) and Feature dependencies (550). A team member will place a Feature (500) within an overall anatomy model (FIG. 5) and establish dependencies (550, 551) towards other Features (510, 520). The intention is to visualize the planned availability over time for the different defined Features. Detailed definition and additional information regarding timing information is part of each individual Feature artifact. The indication if a feature has been taken into design (560) is inherited from the corresponding "Feature Anatomy"; information that is handled via the system integration and can not be influenced by the team member. The information is exchanged in real time through the system integration via push method.

Figure 6:
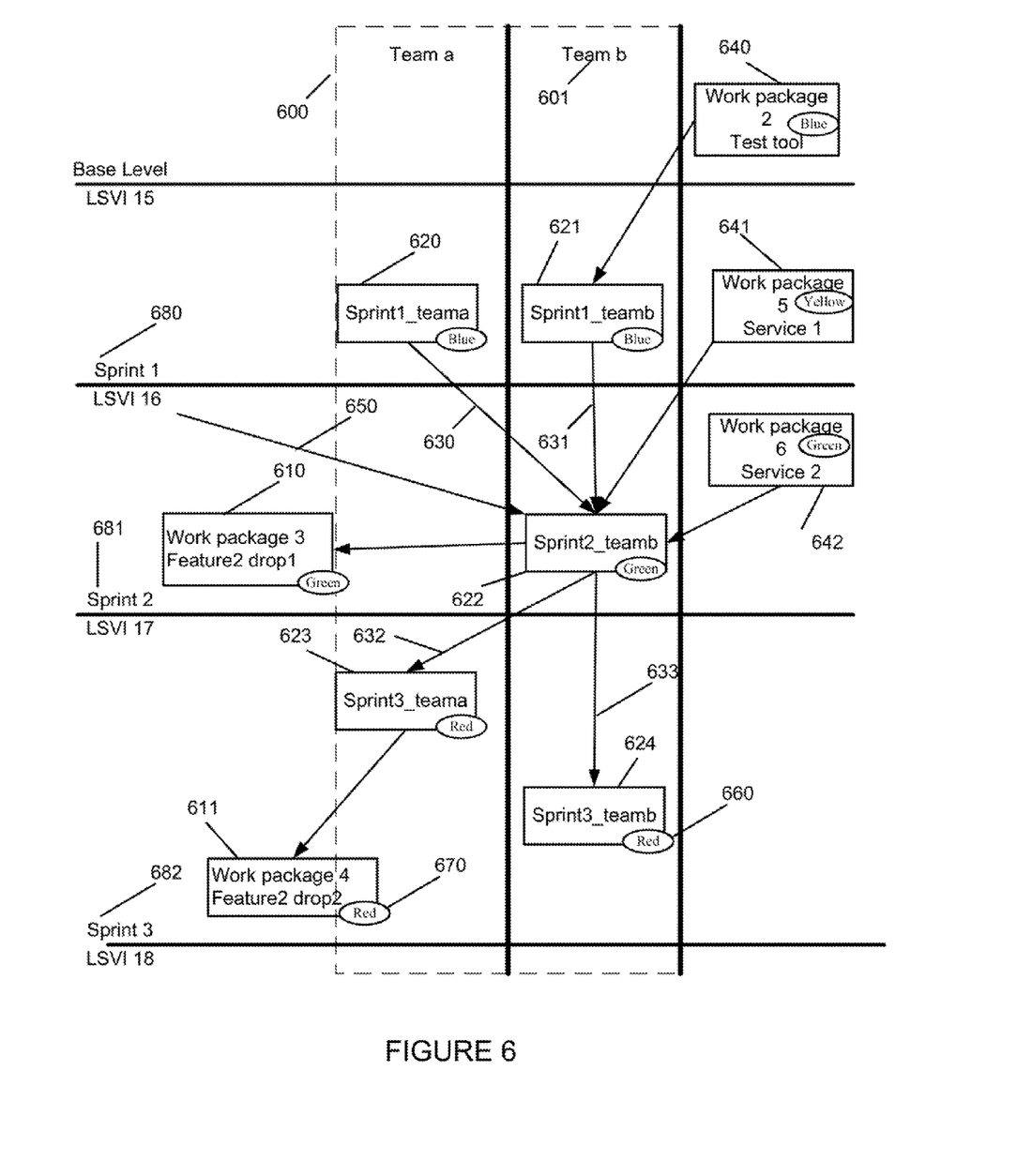
FIG. 6 illustrates an example of a feature anatomy for a feature team consisting of two parallel scrum teams according to an embodiment of the present invention.

FIG. 6 illustrates an example of a feature anatomy for a feature team consisting of two parallel scrum teams (600 and 601), according to an embodiment of the present invention. Feature anatomy shows anatomy information for one feature and information level is on work package (610 and 611) and sprint (team internal increment) (620-624) level. Feature anatomy also shows dependencies between team internal increments (630-633), and from other teams' user stories, increments or work packages 640-642; highlights if merging of software entities is needed due to (planned) parallel work of other feature team on the same software entity (650); and aggregates status information on a per-increment (660) and per work package (670) level.

The team's work items/user stories are assigned to sprints (e.g. in team collaboration application), which are shown as sprints in a certain time box (680-682) in the feature anatomy. Work packages are defined (610, 611); they consist of the resulting products (and short description of impacts) from a certain sprint that is intended to be delivered to a certain LSV (meaning: they are intended to be committed to the trunk branch of the distributed revision control system). Dependencies inside the team (630-633) and external dependencies (640-642) are defined by the team. The anatomy handling application automatically indicates if code merges, from/to the trunk branch (650), need to be done/planned for.

Information, with regard to "Feature Anatomy", is provided via a collaboration application. This application can be, e.g., Rational Team Concert (RTC). Access to the application is controlled by a role based model where only a model owner with a particular role will get "modify" access. The role having modification access are the Feature Teams defined in the collaboration application. The application has to adapt to the dedicated role where the available functionalities have to be limited to the needed actions.

If a feature has been taken into a design, the design iteration will be defined including the corresponding sprints. Each sprint is defined by start and end date, planned Latest System Version (LSV) and can therefore be placed on a time line. Within the collaboration application the dependencies/impacts to other activities/work items of parallel team plans can be displayed. There are different dependencies possible: Blocked, Depends On and DuplicateOff.

Figure 7:
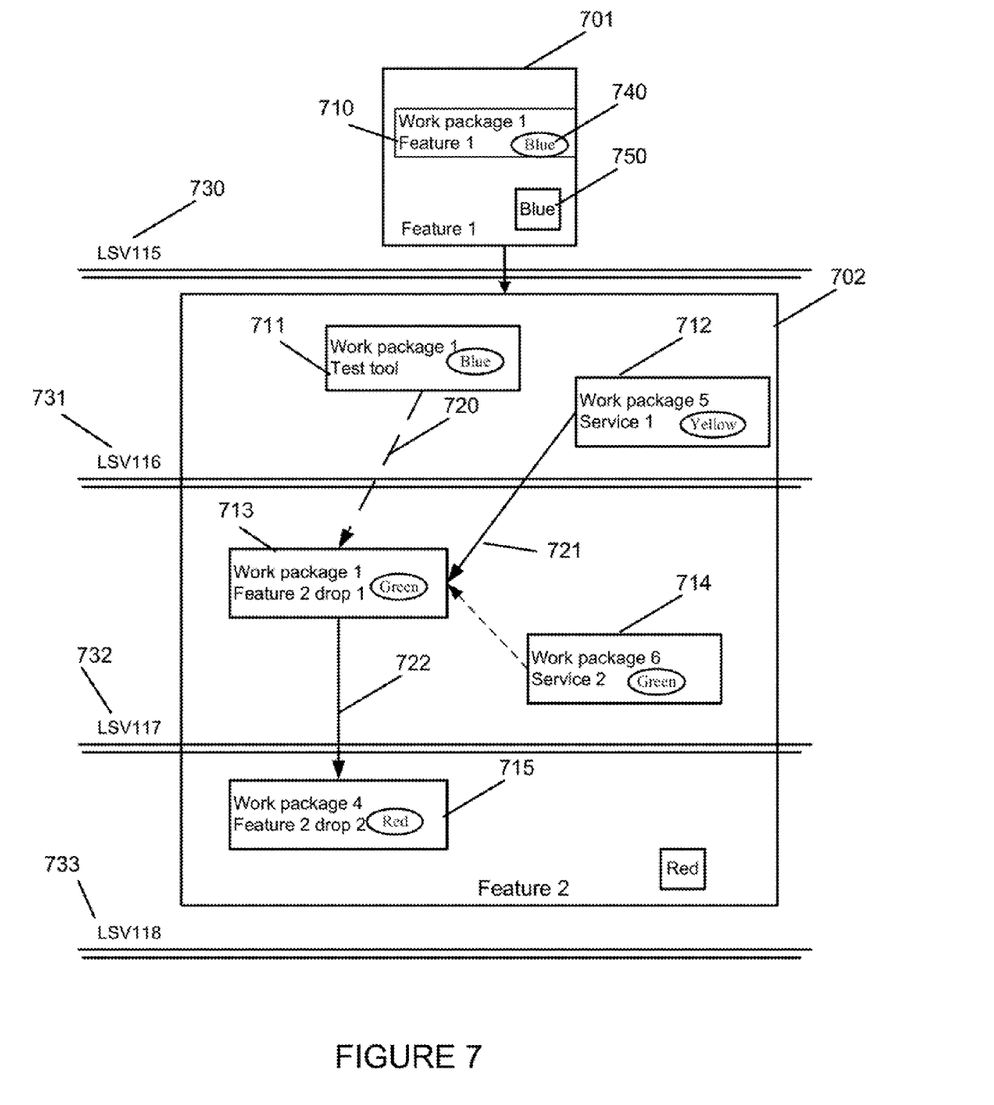
FIG. 7 depicts an example of a product anatomy with two features consisting of several work packages in accordance with an embodiment of the present invention.

FIG. 7 depicts an example of a product anatomy with two features (701, 702) consisting of several work packages (710, and 711-715) in accordance with an embodiment of the present invention. At the product anatomy level, anatomy information is shown for one product (e.g., one network node in a telecommunications network). Information level is on work package level (delivery from feature team branch towards trunk branch); dependencies are shown between Work Packages (720-722) and shown when work packages are delivered to a certain trunk branch increment (730-733); and status information is aggregated on a per-work package level (740) and per-feature (750) level.

Based on the committed availability provided by the feature teams, the release content definition and availability can be seen. The collaboration application will provide information related to the current status of individual teams and sprints (660). This is indicated by colors for easy and quick identification of status and is based on actual status of the tasks which have been identified per sprint.

Actual status of the impacted artifacts from the portfolio and feature anatomy will always be taken into consideration during product anatomy creation. The product anatomy is aggregating and visualizing information out of the portfolio and feature anatomies. The product anatomy visual display will be automatically generated based on the information existing in the portfolio and feature anatomy. Therefore a product anatomy can be seen as a snapshot view.

The information artifacts relevant to the various anatomy levels are stored in the common repository used by all business support applications. Many of the artifacts are entered by the feature teams in collaboration application, for example assigning user stories to sprints, members of a team, the team velocity, the planned work per sprint etc.

Certain information relevant to the anatomy will be entered in requirement handling applications (e.g. RRC), like feature names and impacted products per feature. There is also information that needs to be entered by the user in the anatomy handling application.

Users have an area of influence that can be configured in the anatomy handling application by means of roles. For example, members of a feature team can create and edit artifacts that belong to their team (meaning that they have full control over their own feature anatomy, but they cannot influence other teams' feature anatomies).

The following information is entered in the anatomy handling application in a graphical way* Feature anatomy level:
   Definition of Work Package Deliveries to Trunk Branch (LSV)
      This includes a short summary of the software and architecture modifications that the feature team has implemented. In this way other teams can easily identify if there may be impacts to their work.
   Definition of dependencies between:
   User stories and sprints;
   Sprints and sprints;
   Sprints and work packages;
   Work packages and work packages;

Trunk branch (LSVs) and sprints.
Portfolio anatomy level:
Definition of products;
Definition of releases;
Definition of features;
Assigning products to features;
Assigning features to releases; and
Definition of feature dependencies.

During the portfolio anatomy modeling the user will define the different releases with their commercial features. Within each feature the impacted products have to be defined. Per defined product a dependency is established towards the corresponding product anatomy for the dedicated feature. Out of the feature anatomy the actual health status is inherited from the feature to the portfolio anatomy. The indication of the health status is performed via a color code. The following color indicators, and what the colors represent, can be used:

White (no data) . . . . Not enough historic data to calculate team velocity or no effort data entered into the sprint backlog.

Green (velocity OK) According to current team velocity the sprint backlog can be completed Yellow (velocity >70%) According to the current team velocity the sprint backlog can be completed by more than 70% AND the sprint content remains testable.

Red (velocity <70%) According to the current team velocity the sprint backlog can be completed by less than 70% OR the sprint is not testable.

Blue (finished)

The health status of the node information can only be changed by performing a re-planning of the current sprint corresponding to the feature. The anatomy responsible is not able to change the color coding within the application.

The feature team is only supporting the effort of one dedicated node defined within the feature of the portfolio anatomy. Additional team for other impacted nodes will behave and perform their planning in the same way. Out of this planning and the progress related to the defined tasks the actual health status is calculated from the feature part provided by each of the impacted feature teams. The indication of the health status is performed via a color code where the color code for the actual sprint is similar to the described color coding under portfolio anatomy. In addition a color coding is used to indicate the health status of future planned sprints. The following color indicators can be used:

White (no data) Not enough historical data to calculate the team velocity or no effort data entered into the sprint backlog.

Green (velocity OK) According to current team velocity the sprint backlog can be completed.

Yellow (velocity >70%) According to current team velocity the sprint backlog can be completed with more than 70% AND the sprint content remains testable.

Red (velocity <70%) according to the current team velocity the sprint backlog can be completed with less than 70% OR the sprint is not testable.

Based on the information provided by the portfolio and the feature anatomy the product anatomy is generated automatically. This generation will be on demand by requesting the actual visualization based on the current data or will be available via the actual predefined version of the visualization. Those predefined versions of the product anatomies are snapshot views on the health status over time.

By means of the work package delivery information entered in the anatomy handling application, work package status is calculated from all included sprint status (for example: worst-of-all). The feature status is calculated from all included work package status (for example: worst-of-all). This allows a very transparent status reporting structure where teams can monitor status of other teams and deliveries they are dependent on and can apply special coordination and re-planning where needed.

In detail the inheriting may be done in the following way:
White—All artifacts are white.
Green—All artifacts are green.
Yellow—At least one impacted artifact is yellow and all other artifacts are green.
Red—At least one impacted artifact is read and all other artifacts are yellow or green.
Blue—All artifacts are blue.

The anatomy handling application shall detect conflicts in the team plans and dependencies in the repository (e.g. a dependency defined by a feature team is not working out due to re-planning of another team), the anatomy handling application shall highlight these kind of conflicts graphically in the related anatomy levels. The anatomy handling application shall also issue work items for conflict resolution to the affected teams in the collaboration application.

The planning activities performed in the collaboration application are all related to dedicated start and end dates. Based on this planning data the dependencies between the different plans and packages can be evaluated. If a re-planning of information is done, where the planning is always related to the timeline, the application will perform a consistency check. During this check the dependencies will be evaluated and if needed the team will be informed about the tool analysis by issued tasks.

The impacted feature team will receive a blocking task, which is indicating the problem. Solving the problem can than be performed by cross team coordination or a re-planning session within the impacted team. To get the conflict solved action towards the timeline has to be taken.

Figure 8:
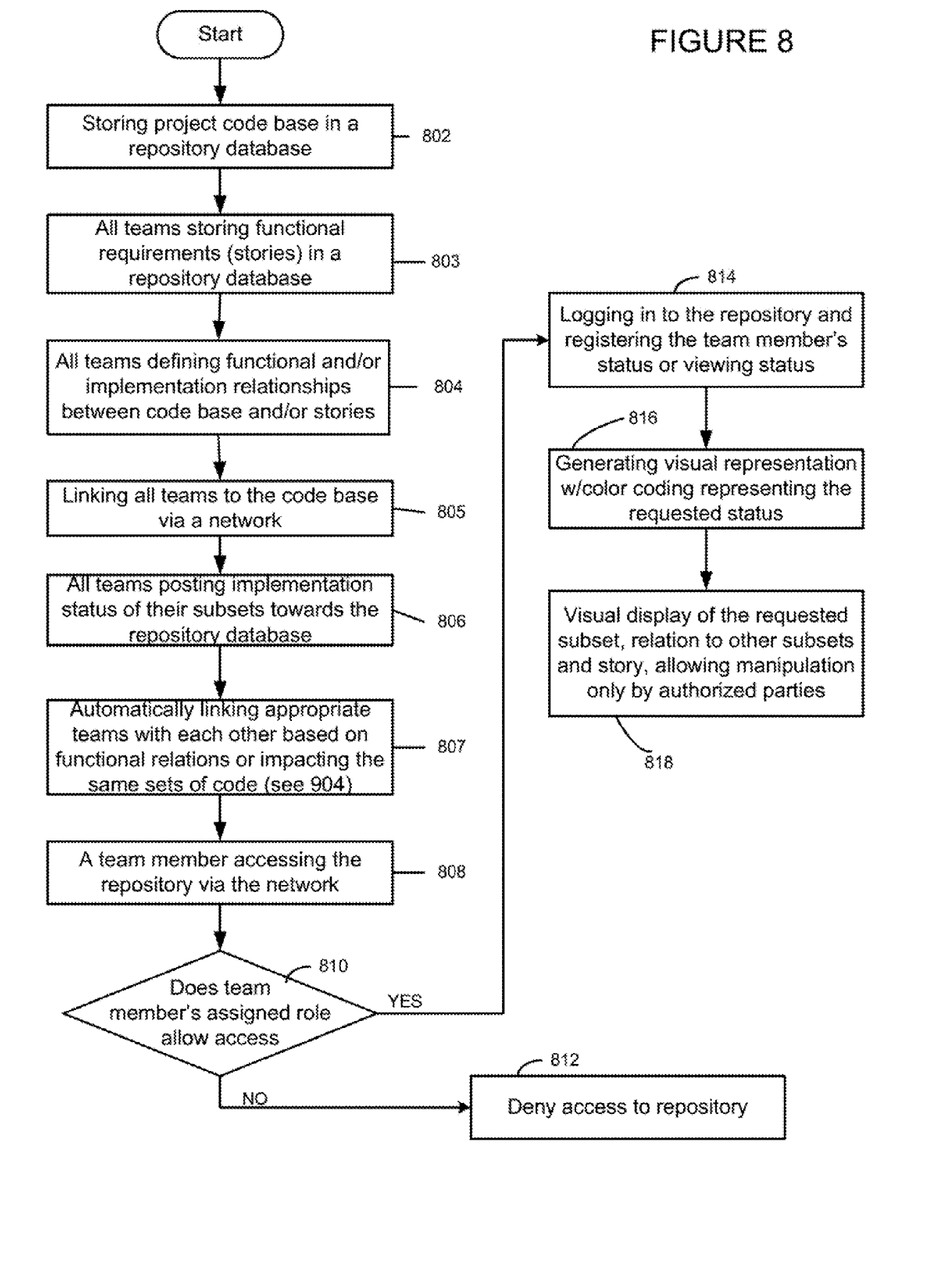
FIG. 8 depicts a high-level flowchart of a process for a visualization and tracking tool (anatomy handling device) which allows agile (scrum) teams to define their deliveries and dependencies within a large-scale software development effort in accordance with an embodiment of the present invention.

FIG. 8 depicts a high-level flowchart of a process for a visualization and tracking tool (anatomy handling device) which allows agile (scrum) teams to define their deliveries and dependencies within a large-scale software development effort in accordance with an embodiment of the present invention. The process begins with step 802, which illustrates storing a project code base in a repository database. The repository database contains code that all the agile teams will work on and the team members can provide status on the portions or work packages for which they are responsible. In step 803, the teams store the functional requirements they should implement in the code base in the repository database. After identifying the functional and/or implementation dependencies/relationships between the functional requirements (stories) and/or the code base levels the teams enters this relationship data into the repository database in step 804.

The process then passes to step 805 which depicts the linking of all the teams to the code base via some network connection, whether it is the network when the project can be worldwide in scope, local area networks, direct connections, etc. The process moves to step 806, where the team constantly whilst working on the implementation of the functional requirements in the code base posts the status of the implementation against the repository database. After each change, the process moves to step 807 where teams having stories or work packages that are directly or, for that matter, indirectly dependent on one another are automatically linked by the anatomy handling device.

The process then proceeds to step 808, which illustrates a team member accessing the repository via the connection to the repository. Each team member has a role or roles assigned that identify the access authority of that member to any particular subset of the overall project. Primarily, access allows a team member to update progress/status on the member's on part of the project and to view the progress of a particular work package (or sub-part) that directly affects that member's progress. When the requested information is displayed, and this is real-time status, it is displayed using color codes that indicate the current status of the work package.

Next the process moves to step 810 that illustrates the anatomy handling device/tool determining the team member's role and whether or not the member is allowed to access the particular subset/work package. If the role does not match the requested access, then the member is refused entry in step 812.

On the other hand, if the role matches the requested access, the process moves to step 814 which depicts the team member logging in to the repository. The process proceeds to step 816, which illustrates the anatomy device generating (on the member's terminal display, for instance) the requested information regarding status and the representation is color coded so that the status is almost immediately apparent, thus saving time.

In step 818, when the status is displayed for the team member, interaction with the display may be allowed. When the team member is updating the member's own status, the convenience of updating on the display, which then may provide a real-time status display for any other member that has accessed that particular work package. However, the only updating or manipulation of the contents of the display is by authorized parties.

Since the anatomy handling device is fully integrated into existing business support applications, re-use of existing data is ensured to the fullest extent thus reducing the level of overhead to an absolute minimum. These advantages are an important step in scaling agile software development methods to large scale software development projects and organizations.

As it will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method, in a network, of synchronizing a plurality of software development teams, each software development team being assigned a subset of a code development project, the plurality of software development teams being synchronized utilizing an anatomy handling device, the method comprising:
the anatomy handling device:
receiving relationship data identifying implementation dependencies between at least some of the subsets of the code development project assigned to the software development teams;
receiving development status information over time for each of the subsets of the code development project;
in response to a request for development status information, generating a visual representation of:
one or more subsets of the code development project associated with each other by implementation dependencies;
implementation dependencies between the visually represented subsets of the code development project; and
color codes indicating a current development status of each of the visually represented subsets of the code development project; and
if implementation of at least a portion of a first subset of the code development project depends on at least a portion of a second subset of the code development project, the anatomy handling device tracking an impact of a current development status of the at least a portion of the second subset on a current development status of the at least a portion of the first subset, and dynamically updating in real-time the current development status of the first subset and an associated one of the color codes indicating the current development status of the first subset based on the tracked impact.

2. The method of claim 1, further comprising:
making available to an agile business support application, used in conjunction with the anatomy handling device, at least one of the following:
the received development status information, and
the current development status of each team's assigned subset of the code development project.

3. The method of claim 1, wherein the plurality of software development teams is at least fifty teams.

4. The method of claim 1, further comprising:
the anatomy handling device automatically notifying each team regarding the current development status of the subset of the code development project assigned to the team and a current development status of any subset of the code development project on which implementation of at least a portion of the team's subset of the code development project depends.

5. An anatomy handling device, in a network for synchronizing efforts of a plurality of software development teams, each software development team working on an assigned subset of a code development project, the anatomy handling device comprising:
one or more processors coupled with one or more memory storage devices containing instructions that, when executed by the one or more processors, cause the anatomy handling device to implement:
a receiver for receiving:
relationship data identifying implementation dependencies between at least some of the subsets of the code development project assigned to the software development teams;
development status information over time for each of the subsets of the code development project; and
a request for development status information;
a correlator for correlating every team's assigned subset of the code development project with every other subset of the code development project on which implementation of the team's assigned subset of the code development project depends;
a display for providing a visual representation of:
one or more subsets of the code development project correlated with each other by implementation dependencies;
implementation dependencies between the visually represented subsets of the code development project; and
color codes indicating a current development status of each of the visually represented subsets of the code development project; and
a tracker for tracking an impact of a current development status of at least a portion of a first subset of the code development project on a current development status of at least a portion of a second subset of the code development project if implementation of the at least a portion of the second subset depends on the at least a portion of the first subset,
wherein the instructions, when executed by the processor, further cause the anatomy handling device to dynamically update in real-time a current development status of the first subset and an associated one of the color codes indicating the current development status of the first subset based on the tracked impact.

6. The anatomy handling device of claim 5, wherein the anatomy handling device is configured to make available to an agile business support application, used in conjunction with the anatomy handling device, at least one of the following:
   the received development status information, and
   the current development status of each team's assigned subset of the code development project.

7. The anatomy handling device of claim 5, wherein the correlator is configured to link a different one of a plurality of particular functional views of the visual representation to each of a plurality of team member roles, the particular functional views including a technical dependency view of related subsets and a resource view.

8. The anatomy handling device of claim 5, wherein the instructions, when executed by the one or more processors, further cause the anatomy handling device to implement:
   a transmitter for sending to each of the plurality of software development teams a notification regarding the current development status of the subset of the code development project assigned to the team and a current development status of any subset of the code development project on which implementation of at least a portion of the team's subset of the code development project depends.

9. The anatomy handling device of claim 5, wherein functions exercised by the device are incorporated in more than one apparatus.

10. A system, in a network, for synchronizing a plurality of software development teams, each software development team working on an assigned subset of a code development project, the system comprising:
   a remote terminal, for access by the each software development team and team member, connected to an anatomy handling device via the network;
   a processor connected to the anatomy handling device and to a memory that stores processor-executable instructions, the processor interfacing with the memory and executing the processor-executable instructions to perform the following operations:
      receiving relationship data identifying implementation dependencies between at least some of the subsets of the code development project assigned to the software development teams;
      receiving development status information over time for each of the subsets of the code development project;
      in response to a request for development status information, generating a visual representation of:
         one or more subsets of the code development project associated with each other by implementation dependencies;
         implementation dependencies between the visually represented subsets of the code development project; and
         color codes indicating a current development status of each of the visually represented subsets of the code development project; and
      if implementation of at least a portion of a first subset of the code development project depends on at least a portion of a second subset of the code development project, the anatomy handling device tracking an impact of a current development status of the at least a portion of the second subset on a current development status of the at least a portion of the first subset, and dynamically updating in real-time the current development status of the first subset and an associated one of the color codes indicating the current development status of the first subset based on the tracked impact.

11. The system of claim 10, wherein the anatomy handling device is configured to make available to an agile business support application, used in conjunction with the anatomy handling device, at least one of the following:
   the received development status information, and
   the current development status of each team's assigned subset of the code development project.

12. The system of claim 10, wherein the anatomy handling device is configured to restrict availability of particular functional views of the visual representation to each of a plurality of team member roles according to a pre-determined requirement, the particular functional views including a technical dependency view of related subsets and a resource view.

13. The system of claim 10, wherein the anatomy handling device includes an interface for sending information to each team regarding the current development status of the subset of the code development project assigned to the team and a current development status of any subset of the code development project on which implementation of at least a portion of the teams' subset of the code development project depends.

14. The system of claim 10, wherein functions exercised by the anatomy handling device are incorporated in more than one arrangement.

* * * * *